H. P. MOXON.
FILM PACKED CAMERA.
APPLICATION FILED MAR. 31, 1916.
1,245,760.
Patented Nov. 6, 1917.
2 SHEETS—SHEET 2.
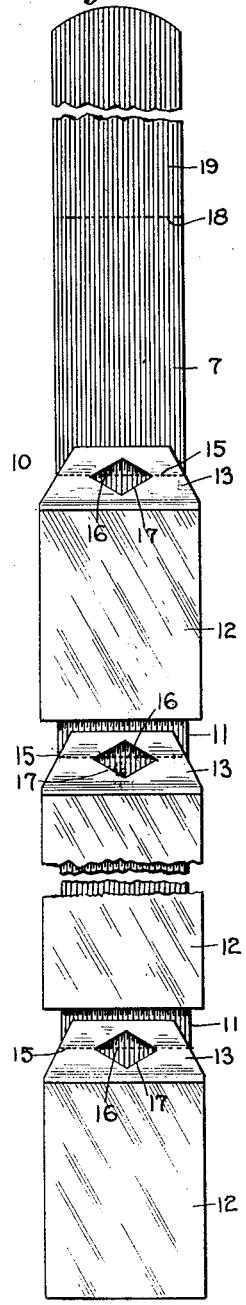
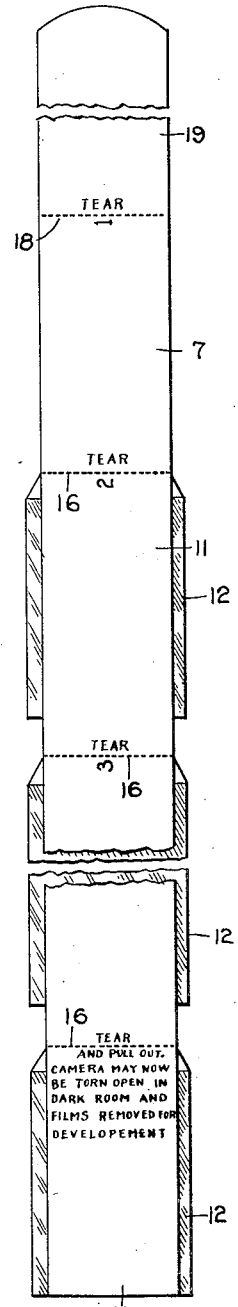
WITNESSES
Frank C. Palmer.
INVENTOR
H. P. Moxon
BY
ATTORNEYS

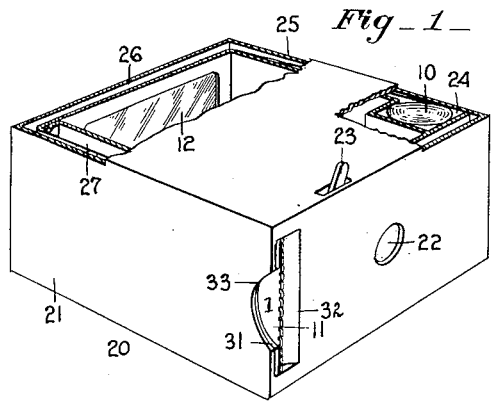
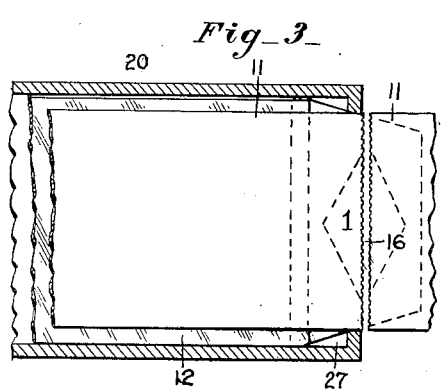
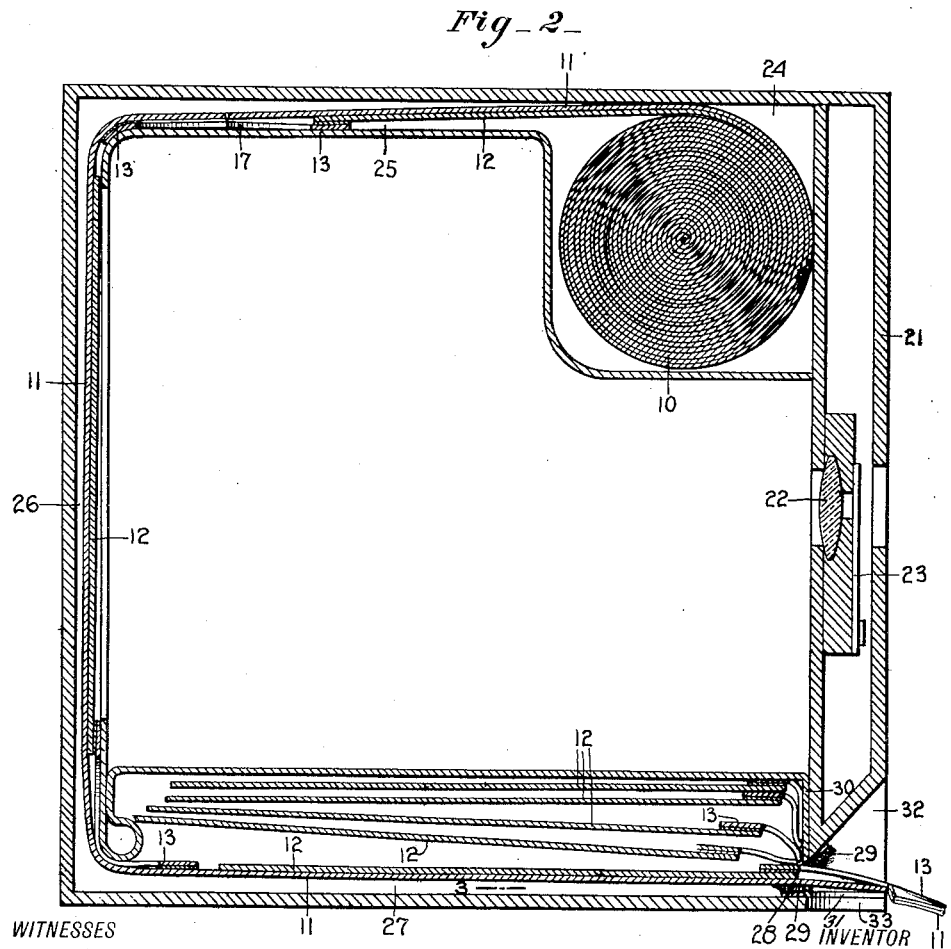

UNITED STATES PATENT OFFICE.

HAROLD P. MOXON, OF BINGHAMTON, NEW YORK.

FILM-PACKED CAMERA.

1,245,760.  Specification of Letters Patent.  Patented Nov. 6, 1917.

Application filed March 31, 1916. Serial No. 87,986.

*To all whom it may concern:*

Be it known that I, HAROLD P. MOXON, a citizen of the Dominion of Canada, and a resident of Binghamton, in the county of Broome and State of New York, have invented a new and Improved Film-Packed Camera, of which the following is a full, clear, and exact description.

The invention relates to photography, and one object is to provide a new and improved film packed camera arranged to allow of conveniently moving single sensitized films successively into the field of exposure, to store the exposed films singly and in flat shape for subsequent removal. Another object is to dispense with the use of spool holders, spools, winding keys and the like, thus permitting the manufacture of the camera loaded with a roll of single films at a low price.

In order to accomplish the desired result, use is made of a sealed camera casing provided with lens and shutter and a roll film within the casing and adapted to be unwound and drawn across the field of exposure of the camera, the exposed films being adapted to be separated and singly stored in flat shape within the casing.

A practical embodiment of the invention is represented in the accompanying drawings forming a part of this specification, in which similar characters of reference indicate corresponding parts in all the views.

Figure 1 is a perspective view of the film packed camera loaded with a film roll and as sold in the market, parts of the camera casing being broken out;

Fig. 2 is an enlarged sectional plan view of the same;

Fig. 3 is a sectional side elevation of part of the same on the line 3—3 of Fig. 2;

Fig. 4 is a face view of the roll film in extended position;

Fig. 5 is a rear face view of the same; and

Fig. 6 is a cross section of the same.

The roll film 10 consists essentially of a carrier 11, preferably in the form of a strip or a ribbon of opaque paper, a series of sensitized films 12 overlying the carrier in spaced relation one to the other, and attaching means 13, such as paper hinges, each connecting the forward end of a film 12 with the carrier 11. Each of the series of films 12 is of a size for a single exposure in the field of the camera and is of the usual type now generally used in the arts. Each film 12 is wider than the carrier 11 and its sides preferably project beyond both sides of the carrier 11, as plainly indicated in Figs. 3, 4 and 5. Each hinge 13 is preferably made of thin paper and its end portions are attached by the use of glue, paste or other fastening means 14 to the carrier and the forward end of the corresponding film 12. The portion of the hinge 13 intermediate the attached end portions is provided with a transverse row of perforations 15 and spaced transverse rows of perforations 16 are arranged on the carrier 11 in register with the rows of perforations 15 on the several hinges 13, as plainly indicated in Figs. 4, 5 and 6, to allow of simultaneously tearing the carrier and hinge along a pair of registering perforations 15 and 16, as hereinafter more fully explained. Each hinge 13 is also provided at its intermediate portion with an opening 17, preferably of diamond shape, and intersected by the corresponding row of perforations 15. The carrier 11 is provided with a section 7 to which the hinge 13 of the first sensitized film 12 is attached, and this section 7 is of a length corresponding to the other carrier sections, each of which is defined by two adjacent rows of perforations 16, as will be readily understood by reference to Figs. 4 and 5. The section 7 is connected by a row of perforations 18 with a starting section 19 of a desired length according to the size of the camera. In order to enable the user of the camera to keep track of the films exposed, the back of the carrier 11 is provided with consecutive numerals or similar indicating characters (see Fig. 5), of which the first one is located adjacent the perforation 18 and the next one along the first perforation 16 and so on along the remaining perforations 16 to the end of the carrier.

The camera 20 in which the roll film is used is preferably of the construction illustrated in Figs. 1, 2 and 3, and is arranged as follows: The casing 21 of the camera is preferably made in the form of a box of cardboard or similar material, and in the forward end of the casing is arranged a lens 22 controlled by a shutter 23 under the control of the user of the camera. On one side of the casing 21 and at the forward end thereof is arranged a chamber 24 for containing the roll film 10, as above described, and from this chamber 24 leads a chamber 25 to an exposure chamber 26 opposite the lens 22 to permit of making the desired exposure of the film 12 within the field of exposure at the time in the chamber 26. The chamber 26 connects with a storage chamber 27 formed in the side of the casing 21 opposite the chambers 24 and 25, and this chamber 27 has its forward end provided with a slot 28 provided at its walls with guarding means 29 such as strips of felt for guarding the chamber 27 against the admission of light. The slot 28 is of a size corresponding to the carrier 11 (see Fig. 3), that is, its length corresponds to the width of the carrier 11 and consequently the length of the slot is less than the width of the films 12 to prevent the latter from passing through the slot. The inner walls of the chambers 24, 25, 26 and 27 are preferably made of sheet metal secured to the top, bottom and front of the casing 21 and the slot 28 is formed in the front 30 of the sheet metal wall of the chamber 27, the said front having a forward extension 31 forming a tearing-off plate on the outer edge of which the carrier sections and hinges 13 can be torn off along the registering perforations 15 and 16. The front of the casing is preferably provided with a double wall, as indicated in Fig. 2, and a portion of the front member is bent inward and terminates adjacent the inner edge of the slot 28 to form a recess 32 for the insertion of a forefinger, and a cut-out portion 33 is provided in the tearing-off plate 31 and the corresponding side of the casing 21 to allow of conveniently inserting the thumb to permit the operator to grip the outer end of the next carrier section and draw the same out through the slot 28 until the next registering rows of perforations 15, 16 register with the outer edge of the tearing-off plate 31. It will be noticed that when the thumb and forefinger grip the outer end of the carrier 11 the forefinger extends through the opening 17 in the half-hinge portion attached to the outer end of the carrier and consequently the operator does not exert an outward pull on the previously detached film 12.

The camera shown and described is loaded with a roll film by the manufacturer so that the roll film is held sealed within the camera casing, but the beginning portion 19 of the carrier 11 is extended through the chambers 25, 26 and 27 with the terminal projecting through the slot 28 to permit the user to grasp this terminal. The camera loaded in the manner described is then ready for the market and the user in order to make the first exposure pulls on the projecting terminal of the beginning portion 19 of the carrier 11 and pulls on the same until the perforation 18 registers with the edge of the tear-off plate 30. At this time the first film 12 is within the exposure chamber 26 and when the operator now manipulates the shutter 23 an exposure is made. The operator in order to make the next exposure pulls on the outer end of the carrier until the next row of perforations 16 registers with the cutting edge of the tear-off plate 30 and then tears off this end of the carrier together with one half portion of the hinge 13 so that the previously exposed film 12 becomes detached from the carrier and remains within the storage chamber 27 while at the same time the second film 12 is within the field of exposure in the chamber 26. It is understood that enough of the end of the carrier extends beyond the slot 28 to be readily grasped by the user of the camera to allow the same to successively draw out carrier portions together with the corresponding hinges to move an unexposed film into the field of exposure and to detach a previously exposed film from the carrier and retain the same in the chamber 27, as will be readily understood by reference to Fig. 2.

By providing each hinge with the opening 17, the user when next gripping the end of the carrier 11 is not liable also to take hold of the half portion of the hinge 13 extending within the storage chamber and the hinge opening registers with the thumb hole and consequently the exposed film is not liable to be forcibly jammed into the slot or drawn out of the storage chamber.

It will be noticed that the user of the camera by reference to the indicating characters on the carrier 11 as they appear on the slot 28 can readily keep track of the exposed film. After the films have all been exposed and housed in the storage chamber 27 the user takes the camera to a dark room, tears the chamber 27 open for the removal of the individual exposed films to be developed in the usual manner. As the camera can be constructed and loaded with a roll film at a price slightly in excess of a pack of films or a roll of films, as now in the market, it is evident that the camera after the exposed films have been removed therefrom can be thrown away.

It is understood that I do not limit myself to the particular construction of the camera and the roll film as described, as the same may be varied without deviating from the invention.

Having thus described my invention, I claim as new and desire to secure by Letters Patent:

1. As an article of manufacture, a roll film packed camera consisting of a sealed camera casing provided with lens and shutter and a roll film held sealed within the casing and provided with a carrier, and a series of films detachably fastened at their forward ends to the carrier and overlying the same in spaced relation, the said carrier and its films being adapted to be unwound from the roll stretched across the field of exposure of the camera and the exposed films subsequently detached from the carrier and stored in flat shape within the camera.

2. In photographic apparatus, a casing having a roll film chamber adapted to contain a roll film, an exposure chamber connected at one end with the said roll film chamber, and a storage chamber connected with the other end of the said exposure chamber and having an outlet slot leading to the outside, the said slot being provided at its walls with means for guarding against admission of light to the said storage chamber.

3. In photographic apparatus, a casing having a roll film chamber adapted to contain a roll film, an exposure chamber connected at one end with the said roll film chamber, a storage chamber connected with the other end of the said exposure chamber and having an outlet slot leading to the outside, the said slot being provided at its walls with means for guarding against admission of light to the said storage chamber, and a tearing plate at the said slot.

4. In photographic apparatus, a casing having a roll film chamber adapted to contain a roll film, an exposure chamber connected at one end with the said roll film chamber, and a storage chamber connected with the other end of the said exposure chamber and having an outlet slot leading to the outside, the said slot being provided at its walls with means for guarding against admission of light to the said storage chamber, the said slot being less in length than the height of the said storage chamber.

5. In photographic apparatus, the combination of a roll film having a carrier and a series of sensitized films detachably secured at one end to the said carrier and overlying the same in spaced relation, and a casing having a roll film chamber adapted to contain the said roll film, the said casing having an exposure chamber provided with an opening in the field of exposure, one end of the said exposure chamber being connected with the said roll film chamber, the said casing having a storage chamber connected with the other end of the exposure chamber and provided with an outlet, the walls of which have means for guarding against admission of light to the said storage chamber, the said carrier and its films being adapted to be unwound and drawn through the said exposure chamber and into the said storage chamber.

6. In photographic apparatus, the combination of a roll film having a carrier and a series of sensitized films detachably secured at one end to the said carrier and overlying the same in spaced relation, and a casing having a roll film chamber adapted to contain the said roll film, the said casing having an exposure chamber provided with an opening in the field of exposure, one end of the said exposure chamber being connected with the said roll film chamber, the said casing having a storage chamber connected with the other end of the exposure chamber and provided with an outlet, the walls of which have means for guarding against admission of light to the said storage chamber, the said carrier and its films being adapted to be unwound and drawn through the said exposure chamber and into the said storage chamber, the said sensitized films exceeding in width the said carrier and the storage chamber corresponding in height to the width of the said films, and the said outlet corresponding in length to the width of the said carrier to allow of drawing the carrier through the outlet, to tear off the projecting end of the carrier and separate the following exposed film from the carrier and to retain the separated exposed film within the storage chamber.

7. As an article of manufacture a permanently closed camera loaded during the process of manufacture with a film which can only be removed by the partial destruction of the camera.

In testimony whereof I have signed my name to this specification in the presence of two subscribing witnesses.

HAROLD P. MOXON.

Witnesses:
A. DEICHELMANN,
J. J. McDAVITT.